(12) United States Patent
Shimazaki (10) Patent No.: US 11,509,006 B2
(45) Date of Patent: Nov. 22, 2022

(54) BATTERY PACK

(71) Applicant: TOYOTA JIDOSHA KABUSHIKI KAISHA, Toyota (JP)

(72) Inventor: Rika Shimazaki, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 16/671,413

(22) Filed: Nov. 1, 2019

(65) Prior Publication Data
US 2020/0153063 A1 May 14, 2020

(30) Foreign Application Priority Data
Nov. 12, 2018 (JP) ............... JP2018-212343

(51) Int. Cl.
*H01M 10/6568* (2014.01)
*H01M 2/02* (2006.01)
(Continued)

(52) U.S. Cl.
CPC ..... *H01M 10/6568* (2015.04); *H01M 10/613* (2015.04); *H01M 10/617* (2015.04); *H01M 10/6555* (2015.04); *H01M 10/6556* (2015.04); *H01M 50/557* (2021.01); *H01M 50/20* (2021.01)

(58) Field of Classification Search
CPC combination set(s) only.
See application file for complete search history.

(56) References Cited

U.S. PATENT DOCUMENTS 5,756,227 A * 5/1998 Suzuki ............... H01M 10/647
429/62
6,761,992 B1 * 7/2004 Marukawa .......... H01M 10/613
429/96
(Continued)

FOREIGN PATENT DOCUMENTS

CN 101765932 A 6/2010
CN 102315501 A 1/2012
(Continued)

OTHER PUBLICATIONS

Rika Shimazaki, U.S. Appl. No. 16/671,309, Office Action dated Oct. 4, 2021.

*Primary Examiner* — Kaity V Chandler
(74) *Attorney, Agent, or Firm* — Dickinson Wright, PLLC (57) ABSTRACT

A battery pack includes a plurality of cells, a refrigerant pipe, a plurality of cooling members, and a restraining unit. Each of the cooling members includes a plate-shaped portion interposed between the cells, and a contact portion jutting out from between the cells and contacting the refrigerant pipe. The restraining unit includes a pair of restraining members and a support member supporting the pair of restraining members, the pair of restraining members restraining opposite ends of the plurality of cells arranged with the plurality of cooling members interposed. The cooling members include one or more first cooling members and one or more second cooling members, the one or more second cooling members having a heat capacity higher than the one or more first cooling members and having a greater contact area with the refrigerant pipe than the one or more first cooling members.

1 Claim, 6 Drawing Sheets

(51) Int. Cl.
*H01M 50/557* (2021.01)
*H01M 10/6555* (2014.01)
*H01M 10/6556* (2014.01)
*H01M 10/613* (2014.01)
*H01M 10/617* (2014.01)
*H01M 50/20* (2021.01)

(56) References Cited

U.S. PATENT DOCUMENTS

| | | | |
|---|---|---|---|
| 9,705,156 B2* | 7/2017 | Dorsch | H01M 10/0525 |
| 2006/0169507 A1* | 8/2006 | Inoue | H01M 10/6563 |
| | | | 180/68.4 |
| 2010/0190049 A1 | 7/2010 | Kawase et al. | |
| 2012/0009455 A1 | 1/2012 | Yoon | |
| 2012/0234613 A1* | 9/2012 | Miyatake | E02F 9/0858 |
| | | | 180/65.1 |
| 2012/0301772 A1* | 11/2012 | Hirsch | H01M 10/6554 |
| | | | 429/120 |
| 2013/0011713 A1* | 1/2013 | Harada | H01M 10/613 |
| | | | 429/120 |
| 2013/0130086 A1* | 5/2013 | Schaefer | H01M 10/6555 |
| | | | 429/120 |
| 2013/0202924 A1* | 8/2013 | Kwak | H01M 10/6561 |
| | | | 429/81 |
| 2015/0064521 A1 | 3/2015 | Watanabe et al. | |
| 2016/0190526 A1* | 6/2016 | Yamada | B60L 50/66 |
| | | | 180/68.5 |
| 2016/0336549 A1* | 11/2016 | Brisbane | H01M 10/625 |
| 2017/0098814 A1* | 4/2017 | Golubkov | H01R 13/696 |
| 2017/0104252 A1* | 4/2017 | Wunsche | H01M 10/647 |
| 2017/0110773 A1* | 4/2017 | Pucher | H01M 10/6556 |
| 2019/0252715 A1 | 8/2019 | Kawase et al. | |
| 2020/0144683 A1 | 5/2020 | Shimazaki | |
| 2020/0153058 A1 | 5/2020 | Shimazaki | |

FOREIGN PATENT DOCUMENTS

| | | | | |
|---|---|---|---|---|
| CN | 105633320 A | | 6/2016 | |
| CN | 205609622 U | * | 9/2016 | |
| CN | 104321902 B | * | 6/2017 | H01M 10/6556 |
| CN | 107431259 A | * | 12/2017 | H01M 10/613 |
| JP | 2003-249205 A | | 9/2003 | |
| JP | 2009-026703 A | | 2/2009 | |
| JP | 2011-165361 A | | 8/2011 | |
| JP | 2012022830 A | * | 2/2012 | |
| JP | 2013-045578 A | | 3/2013 | |
| JP | 2013-222563 A | | 10/2013 | |
| JP | 2013225432 A | * | 10/2013 | |
| JP | 2015-053261 A | | 3/2015 | |
| JP | 2015-076187 A | | 4/2015 | |
| JP | 2017-041311 A | | 2/2017 | |
| JP | 2017-123313 A | | 7/2017 | |
| WO | 2011061931 A1 | | 5/2011 | |

* cited by examiner

BATTERY PACK

CROSS REFERENCE TO RELATED APPLICATION

The present application claims priority from Japanese Patent Application No. 2018-212343 filed on Nov. 12, 2018, which is incorporated by reference herein in its entirety.

BACKGROUND

The present disclosure relates to a battery pack.

JP 2013-045578 A discloses a battery pack equipped with cooling plates between adjacent battery cells and including a connecting pipe that supplies each of the cooling plates with a refrigerant. It is also disclosed that the connecting pipe is a flexible pipe.

JP 2009-026703 A discloses a battery pack including cells stacked in a stacking direction, wherein an end plate arranged at a stacking end is configured to be capable of changing the thickness with respect to the stacking direction.

SUMMARY

Generally, battery packs are easy to accumulate heat in a certain portion along a stacking direction. Consequently, a temperature variation may occur among the stacked battery cells.

A battery pack disclosed herein includes a plurality of cells, a refrigerant pipe, a plurality of cooling members, and a restraining unit. Each of the plurality of cells includes a pair of planar portions opposed to each other, and the plurality of cells are arranged such that planar portions of each adjacent pair of the cells are in a face-to-face relationship. The refrigerant pipe extends alongside the plurality of cells arranged side by side, and along a direction in which the plurality of cells are arranged.

Each of the cooling members is disposed between each adjacent pair of the cells or between each set of adjacent pairs of the cells wherein each set of adjacent pairs of the cells includes a plurality of adjacent pairs of the cells. Each of the cooling members includes a plate-shaped portion interposed between the cells, and a contact portion jutting out from between the cells and contacting the refrigerant pipe. The restraining unit includes a pair of restraining members and a support member supporting the pair of restraining members, the pair of restraining members restraining opposite ends of the plurality of cells arranged with the plurality of cooling members interposed. The cooling members include one or more first cooling members and one or more second cooling members, the one or more second cooling members having a higher heat capacity and a greater contact area with the refrigerant pipe than the one or more first cooling members. Such an embodiment of the battery pack makes it possible to stabilize the temperatures of the cells in regions in which the one or more second cooling members are disposed, along the direction in which the plurality of cells are arranged. This serves to reduce the temperature variations between the plurality of cells.

For example, the one or more second cooling members may be disposed intermittently between adjacent pairs of the cells or between sets of adjacent pairs of the cells, along a direction in which the plurality of cells are arranged.

Also, in cases where the refrigerant pipe is configured to flow a refrigerant in one of the directions in which the plurality of cells are arranged, intervals between the second cooling members may be equal or narrower along the direction in which the refrigerant flows in the refrigerant pipe. It is also possible that, in cases where the refrigerant pipe is configured to flow a refrigerant in one of the directions in which the plurality of cells are arranged, heat capacities of the second cooling members may be equal or greater along the direction in which the refrigerant flows in the refrigerant pipe.

Each of the one or more second cooling members may include a pair of plates and an elastic body disposed between the pair of plates, the pair of plates respectively placed against respective planar portions of the cells adjacent thereto in a region where the each of the one or more second cooling members is disposed. In this case, each of the pair of the plates may include a contact portion, and has a higher heat capacity and a greater contact area with the refrigerant pipe than the one or more first cooling members.

It is also possible that one of the pair of the plates may be disposed immovably relative to the restraining member, and the other one of the pair of the plates may be disposed movably relative to the restraining member.

In each of the one or more second cooling members, the plate-shaped portion may be thinner than the contact portion in a direction in which the plurality of cells are arranged.

Each of the cells may be, for example, a laminate-type cell including an electrode assembly and a laminate film covering the electrode assembly. Each of the cells may be, for example, an all-solid-state cell.

DETAILED DESCRIPTION

The following describes an embodiment of a battery pack disclosed herein. It should be noted, however, that the embodiments described herein are, of course, not intended to limit the present invention. The present invention is not limited to the embodiments described herein unless specifically stated otherwise.

Figure 1:
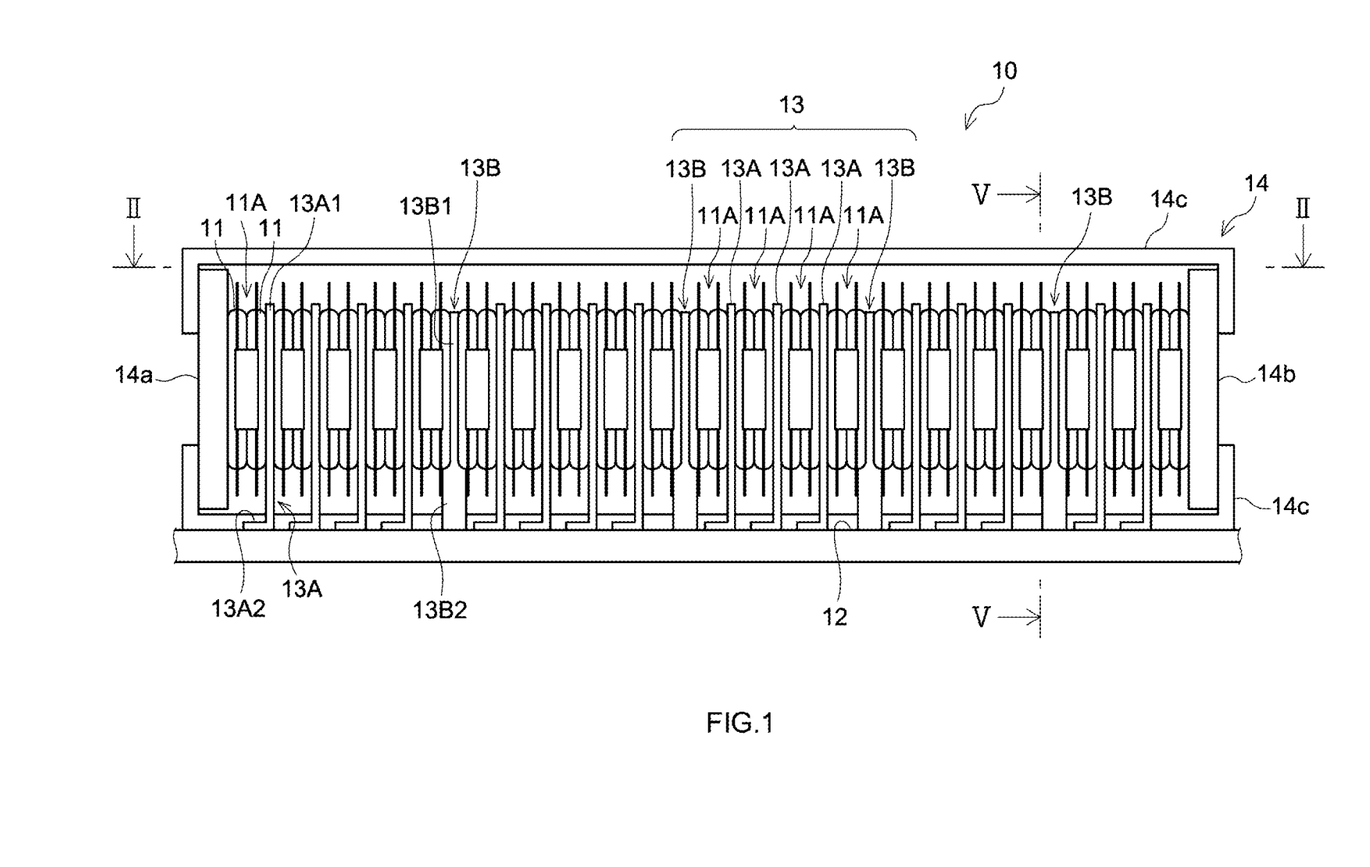
FIG. 1 is a side view schematically illustrating a battery pack 10 disclosed herein.
Figure 2:
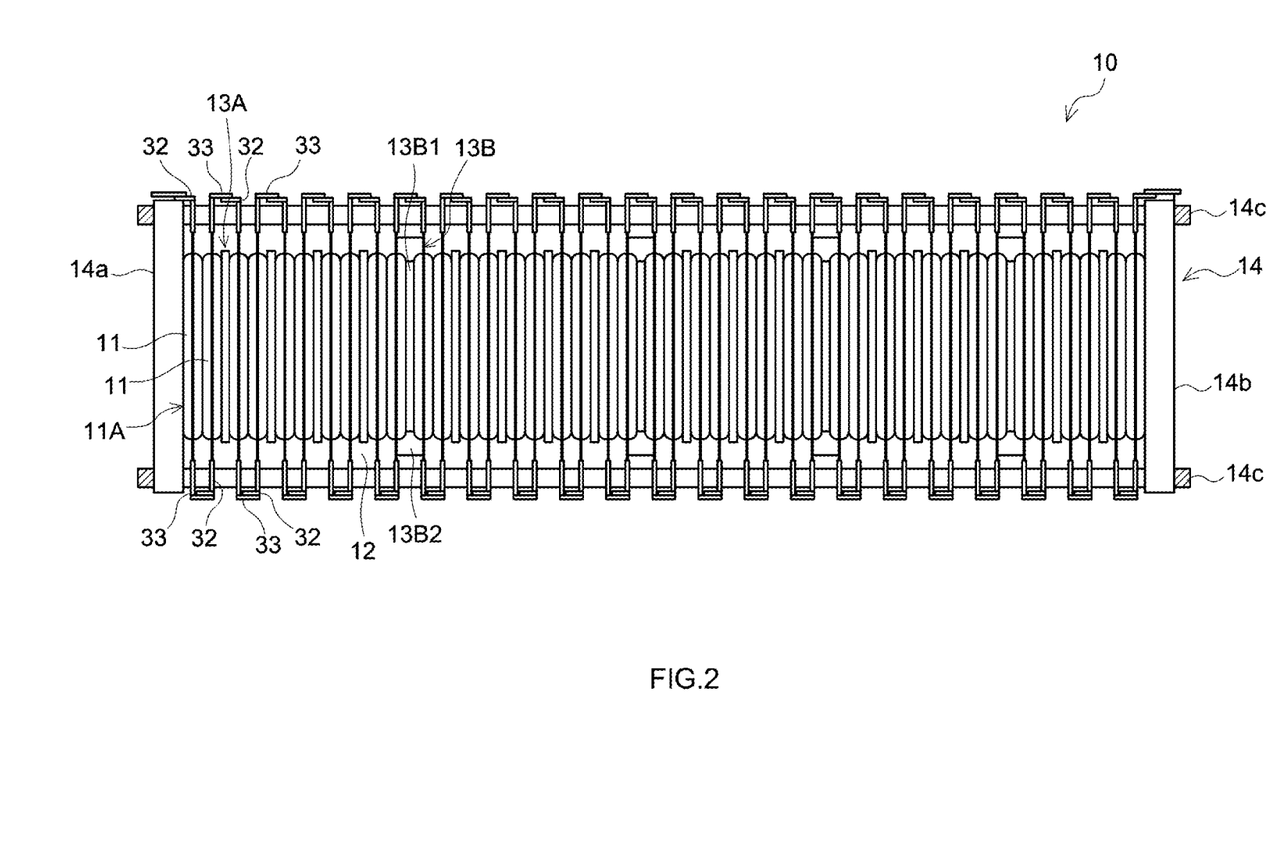
FIG. 2 is a plan view illustrating a plurality of cells 11 and a plurality of cooling members 13 that are stacked one on another.
Figure 3:
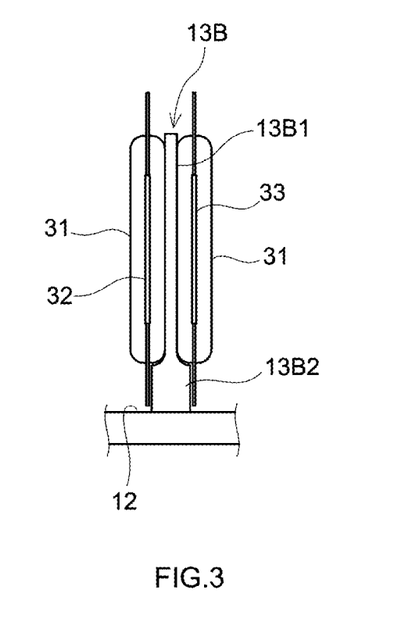
FIG. 3 is a side view illustrating a second cooling member 13B and cells 11 that sandwiches the second cooling member 13B.

FIG. 1 is a side view schematically illustrating a battery pack 10 disclosed herein. As illustrated in FIG. 1, the battery pack 10 disclosed herein includes a plurality of cells 11, a refrigerant pipe 12, a plurality of cooling members 13, and a restraining unit 14. FIG. 2 is a plan view illustrating a plurality of cells 11 and a plurality of cooling members 13 that are stacked one on another. FIG. 2 shows a plan view taken along line II-II in FIG. 1. The refrigerant pipe 12 and some part of the restraining unit 14 are not shown in FIG. 2. As illustrated in FIGS. 1 and 2, the cooling members 13 include a first cooling member 13A and a second cooling member 13B. FIG. 3 is a side view illustrating a second cooling member 13B and cells 11 that sandwiches the second cooling member 13B.

Cell 11

Each of the plurality of cells 11 includes a pair of planar portions opposed to each other, and adjacent ones of the cells 11 are arranged so that the planar portions of the adjacent ones of the cells 11 face each other. Each of the cells 11 is a unit cell that constitutes a battery pack. In the present description, the term "battery" is intended to mean any electricity storage device in general that is capable of providing electric energy therefrom, which is intended to include primary batteries and secondary batteries. The term "secondary battery" refers to a repeatedly chargeable electricity storage device in general, and it is intended to encompass what is called storage batteries (chemical cells), such as lithium-ion secondary batteries, nickel-metal hydride batteries, and nickel-cadmium batteries, as well as capacitors (i.e., physical cells) such as electric double-layer capacitors.

Figure 4:
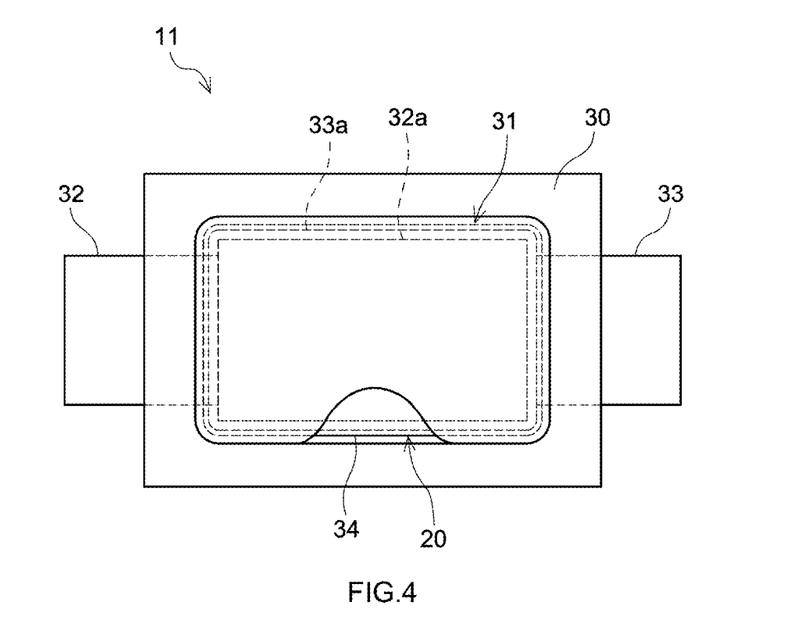
FIG. 4 is a front view of the cell 11.

FIG. 4 is a plan view of the cell 11. In this embodiment, the cell 11 is a laminate-type cell in which an electrode assembly 20 is covered with a laminate film 30. FIG. 4 depicts an illustration in which a part of the laminate film 30 is cut out and the electrode assembly 20 is partially exposed. The cell 11 is an all-solid-state battery. The all-solid-state battery includes an electrolyte that is composed of a solid electrolyte. In order to allow the charge carriers to be transferred smoothly through the solid electrolyte and keep the resistance low, the all-solid-state battery requires that an appropriate pressure be applied to the electrode assembly 20 so that sufficient contact is ensured between the electrode active materials and the solid electrolyte. On the other hand, the expansion during charge and the contraction during discharge are considerable. In addition, the cell 11 generates heat during charge and discharge. It is preferable that the battery pack 10 be able to keep the temperature variations small between the plurality of cells 11 that are incorporated into the battery pack 10.

Each of the cells 11 is a laminate-type cell in which the entire circumference of the electrode assembly 20 is covered with the laminate film 30. As illustrated in FIGS. 3 and 4, the cell 11 includes planar portions 31, a positive electrode terminal 32, and a negative electrode terminal 33.

The planar portions 31 are parts of the cell 11 in which the electrode assembly 20 is enclosed. In this embodiment, each of the cells 11 is composed of an all-solid-state battery. The electrode assembly 20 has a stacked structure in which, for example, a positive electrode current collector, a positive electrode layer 32a, a solid electrolyte layer 34, a negative electrode layer 33a, and a negative electrode current collector are stacked one on another, although some are not shown in the drawings In this embodiment, the outermost circumference of the electrode assembly 20 is covered by the solid electrolyte layer 34.

In this embodiment, as illustrated in FIGS. 3 and 4, each of the planar portions 31 of the cell 11 is in a substantially rectangular shape, and each of the planar portions 31 is a part that covers the electrode assembly 20 in a substantially rectangular flat shape. The laminate film 30 seals the cell 11 so as to cover the circumference of the planar portions 31.

The electrode assembly 20, which is to be enclosed in the planar portions 31, includes the positive electrode current collector (not shown) stacked in the electrode assembly 20, the positive electrode layer 32a staked on the positive electrode current collector, the solid electrolyte layer 34 stacked so as to cover the positive electrode layer 32a, the negative electrode layer 33a stacked on the solid electrolyte layer 34, and the negative electrode current collector (not shown). Each of the positive electrode current collector, the positive electrode layer 32a, the solid electrolyte layer 34, the negative electrode layer 33a, and the negative electrode current collector (not shown) is in a substantially rectangular shape. For simplicity in illustration, FIG. 4 does not show the positive electrode current collector, the negative electrode current collector, and the solid electrolyte layer.

The positive electrode layer 32a is a solid electrolyte layer containing a positive electrode active material. The negative electrode layer 33a is a solid electrolyte layer containing a negative electrode active material. The solid electrolyte layer 34 is a solid electrolyte layer containing no active material. Both the negative electrode layer 33a and the solid electrolyte layer 34 are slightly larger in size than the positive electrode layer 32a so that they cover the positive electrode layer 32a in a stacking direction.

The positive electrode current collector is provided with the positive electrode terminal 32. The negative electrode current collector is provided with the negative electrode terminal 33. The positive electrode terminal 32 protrudes from one end of the laminate film, in which the electrode assembly is enclosed. The negative electrode terminal 33 protrudes from the other end of the laminate film, in which the electrode assembly is enclosed. In the embodiment, the positive electrode terminal 32 is provided on one end of the planar portions 31, in which the electrode assembly is enclosed, and the negative electrode terminal 33 is provided on the other end of the planar portions 31.

Thus, in this embodiment, each of the planar portions 31 has a pair of opposing ends, and the positive electrode terminal 32 is disposed at one of the opposing ends while the negative electrode terminal 33 is disposed at the other end. The plurality of cells 11 are oriented alternately such that, in each adjacent pair of the cells 11, the positive electrode terminal 32 of one of the cells 11 and the negative electrode terminal 33 of the other one are disposed on the same side.

When each adjacent pair of the cells 11 are connected in series, the positive electrode terminal 32 of one of the cells 11 and the negative electrode terminal 33 of the other one are disposed on the same side in each adjacent pair of the cells 11. In other words, the adjacent cells 11 are oriented alternately. Although not shown in the drawings, when each adjacent pair of the cells 11 are connected in parallel, the plurality of cells 11 are oriented uniformly such that, in each adjacent pair of the cells 11, the positive electrode terminals 32 of both cells 11 are disposed on one side and the negative electrode terminals 33 of both cells 11 are on the other side. In other words, the adjacent cells 11 are oriented in the same direction.

Various proposals have been made for the laminate film for the laminate-type cell, the positive electrode active material, the negative electrode active material, and the solid electrolyte for constructing an all-solid-state battery, and there is no particular restriction on such components. Note that in the present embodiment, each of the planar portions 31 of the cell 11 is in a substantially rectangular shape. However, unless specifically stated otherwise, the planar portions 31 of the cell 11 need not be in a substantially rectangular shape. In another embodiment, the positive electrode terminal 32 and the negative electrode terminal 33 may protrude in the same direction from the inside of the laminate film enclosing the electrode assembly 20. Thus, the position at which the positive electrode terminal 32 or the negative electrode terminal 33 protrudes from the inside of the laminate film enclosing the electrode assembly 20 is not limited to the above-described embodiment, unless specifically stated otherwise.

Refrigerant Pipe 12

The refrigerant pipe 12 extends alongside the plurality of cells 11 arranged side by side, and along a direction in which the plurality of cells 11 are arranged. The refrigerant pipe 12 may be configured such as to flow the refrigerant through the pipe. The refrigerant pipe 12 may have an appropriate thermal conductivity. From the viewpoint of weight reduction, the material of the refrigerant pipe 12 may be, for example, aluminum or an aluminum alloy. In this embodiment, a refrigerant flows through the refrigerant pipe 12 along a direction in which the plurality of the cells 11 are arranged. In this embodiment, as illustrated in FIG. 1, the refrigerant pipe 12 is disposed on a side face that is other than the side faces at which the positive electrode terminals 32 and the negative electrode terminals 33 are disposed, with respect to the plurality of cells 11 that are arranged side by side.

Cooling Member 13

The cooling members 13 are disposed between sets of cell pairs 11A, wherein each set of the cell pairs 11A includes a plurality of adjacent pairs of the plurality of cells 11. Although this embodiment illustrates that the cooling members 13 are disposed between sets of cell pairs 11A, this embodiment should be considered to be merely illustrative and not restrictive. For example, it is also possible that the cooling members 13 may be disposed between adjacent pairs of the plurality of cells 11.

Restraining Unit 14

The restraining unit 14 includes a pair of restraining members 14a and 14b, and two support members 14c that support the restraining members 14a and 14b. In this embodiment, the pair of restraining members 14a and 14b are members that restrain opposite ends of the plurality of cells 11 that are arranged side by side with the cooling members 13 interposed. The restraining members 14a and 14b may also be referred to as end plates. Each of the support members 14c in this embodiment is a metal band spanning between the pair of restraining members 14a and 14b. The support members 14c may also be referred to as restraining bands.

First Cooling Member 13A and Second Cooling Member 13B

As illustrated in FIGS. 1 and 2, the cooling members 13 include first cooling members 13A and second cooling members 13B. The first cooling members 13A and the second cooling members 13B may be made of, for example, aluminum or aluminum alloy from the viewpoint of obtaining a required thermal conductivity and achieving weight reduction.

The first cooling members 13A and the second cooling members 13B may include plate-shaped portions 13A1 and 13B1, respectively, and contact portions 13A2 and 13B2, respectively. The plate-shaped portions 13A1 and 13B1 may be interposed between the cells 11. The contact portions 13A2 and 13B2 jut out from between the cells 11 and contact the refrigerant pipe 12.

As illustrated in FIGS. 1 and 2, in this embodiment, the restraining bands include two support members 14c. The two support members 14c are provided separately at both sides of the pair of restraining members 14a and 14b of the restraining unit 14 such as to span between the pair of restraining members 14a and 14b. The contact portions 13A2 and 13B2 of the first cooling members 13A and the second cooling members 13B are directly in contact with the refrigerant pipe 12.

The first cooling members 13A and the second cooling members 13B exchange heat with the refrigerant pipe 12 via the contact portions 13A2 and 13B2, respectively. As a result, the first cooling members 13A and the second cooling members 13B are cooled to substantially a constant temperature. Further, the first cooling members 13A and the second cooling members 13B exchange heat with the cells 11 that sandwich the first cooling members 13A and the second cooling members 13B. As a result, the cells 11 are cooled.

The second cooling members 13B have a higher heat capacity than the first cooling members 13A, and a greater contact area with the refrigerant pipe 12 than the first cooling members 13A. For example, when both the first cooling members 13A and the second cooling members 13B are made of the same material, the first cooling members 13A may be composed of a thinner member than the second cooling members 13B. In addition, each of the contact portions 13A2 of the first cooling members 13A may have a smaller contact area with the refrigerant pipe 12 than each of the contact portions 13B2 of the second cooling members 13B.

Figure 5:
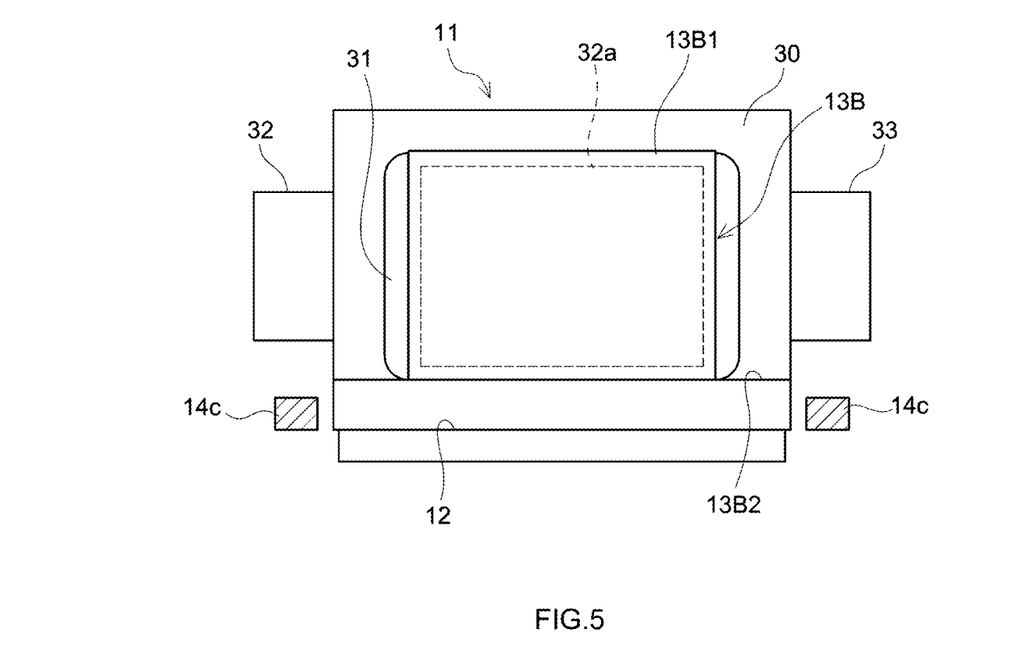
FIG. 5 is a front view illustrating a second cooling member 13B that is placed on a cell 11.

FIG. 5 is a front view illustrating a second cooling member 13B that is placed on a cell 11. Here, FIG. 5 shows a cross-sectional view taken along line V-V in FIG. 1, which illustrates a cell 11, a second cooling member 13B fitted on the cell 11, a lower support member 14c of the restraining unit 14, and the refrigerant pipe 12. As seen in FIG. 5, in the embodiment shown in FIGS. 1 and 2, the support members 14c of the restraining unit 14 are provided separately at both sides such as to sandwich the refrigerant pipe 12. The contact portion 13B2 of the second cooling member 13B is directly in contact with the refrigerant pipe 12. As illustrated in FIG. 5, when fitted on the cell 11, the plate-shaped portion 13B1 of the second cooling member 13B may cover at least the positive electrode layer 32a within the planar portion 31 of the cell 11. In other words, the plate-shaped portion 13B1 of each of the second cooling members 13B may have a width and a height that are sufficient to cover the positive electrode layer 32a within the planar portion 31 of the cell 11. The contact portion 13B2 may be formed wide so that it can contact with the refrigerant pipe 12 with a sufficient contact area, and for example, the contact portion 13B2 may be thicker than the plate-shaped portion 13B1. On the other hand, each of the first cooling members 13A may be a plate-shaped member such that the plate-shaped portion 13A1 and the contact portion 13A2 have substantially the same thickness, for example, as illustrated in FIG. 1.

The contact portion 13B2 of each of the second cooling members 13B is a thick portion having a required volume, as illustrated in FIGS. 3 and 5. Each of the second cooling members 13B includes the plate-shaped portion 13B1 extending from the intermediate portion of the contact portion 13B2. The plate-shaped portion 13B1 is disposed such that the normal lies in a direction in which the plurality of cells 11 are arranged, and the plate-shaped portion 13B1 is interposed between each pair of cells 11. The plate-shaped portion 13B1 is not as thick as the contact portion 13B2. The plate-shaped portion 13B1 is recessed from both sides of the contact portion 13B2, in the directions in which the plurality of cells 11 are arranged. The planar portions 31 of the adjacent cells 11 abut on the recessed plate-shaped portion 13B1. Thus, the plate-shaped portion 13B1 of each of the second cooling members 13B is thinner than the contact portion 13B2 in a direction in which the plurality of cells 11 are arranged. As a result, it is ensured that the contact portion 13B2 has a sufficiently wide contact area with the refrigerant pipe 12, and the region to which the cells 11 are fitted has a sufficiently small thickness. This serves to reduce the thickness of the battery pack 10 along a direction in which the cells 11 are arranged. The wall thickness of the second cooling member 13B may be equal to or greater than 0.5 mm, for example, in the region to which the planar portion 31 of the cell 11 is fitted.

In this embodiment, heat is taken away substantially uniformly from the cells 11 in the regions where the first cooling members 13A are disposed. Because the second cooling members 13B have a higher heat capacity and a greater contact area with the refrigerant pipe 12 than the first cooling members 13A, the second cooling members 13B can perform heat exchange with the refrigerant pipe 12 more efficiently. This means that the second cooling members 13B have greater capability of transferring heat from the cells 11 than the first cooling members 13A. In other words, it is possible to stabilize the temperatures of the cells 11 in the regions where the second cooling members 13B are disposed. The second cooling members 13B may be disposed, for example, at the regions of the plurality of cells 11 in which heat is likely to accumulate in the battery pack 10. Note that although the second cooling members 13B are more advantageous than the first cooling members 13A from the viewpoint of heat exchange with the cells 11, the second cooling members 13B are higher in component cost and heavier in weight than the first cooling members 13A. For this reason, if all the cooling members 13 are the second cooling members 13B, it may be disadvantageous in terms of cost and weight reduction.

In addition, because of the heat exchange with the cooling members 13, the temperature of the refrigerant flowing through the refrigerant pipe 12 tends to be gradually higher along a direction in which the plurality of cells 11 are arranged. Thus, if all of the cooling members 13 are composed of the first cooling members 13A, the first cooling members 13A are more difficult to cool along a direction in which the plurality of cells 11 are arranged. Therefore, the cells 11 are likely to show temperature variations. In contrast, when the second cooling members 13B are disposed intermittently along a direction in which the plurality of cells 11 are arranged as shown in FIG. 1, the temperatures of the cells 11 are stabilized intermittently, so the temperature variations are lessened over the plurality of cells 11 as a whole. Thus, the second cooling members 13B may be disposed intermittently between sets of the cell pairs 11A, along a direction in which the plurality of cells 11 are arranged.

For example, as illustrated in FIG. 1, the second cooling members 13B are disposed intermittently between adjacent cells 11 or adjacent cell pairs 11A, along a direction in which the plurality of cells 11 are arranged. In this embodiment, as illustrated in FIG. 1, ten cells 11 are disposed between the restraining member 14a and the first one of the second cooling members 13B, along the direction in which the refrigerant flows in the refrigerant pipe 12. Ten cells 11 are disposed between the restraining member 14a and the first one of the second cooling members 13B. Likewise, ten cells 11 are disposed between the first one of the second cooling members 13B and the second one of the second cooling members 13B. Eight cells 11 are disposed between the second one of the second cooling members 13B and the third one of the second cooling members 13B. Six cells 11 are disposed between the third one of the second cooling members 13B and the restraining member 14b. Thus, the intervals between the second cooling members 13B are equal or narrower along the direction in which the refrigerant flows in the refrigerant pipe 12. Note that the first cooling members 13A are disposed between each cell set 11A of the plurality of cells 11, except for the regions between the cell sets 11A in which the second cooling members 13B are disposed.

Note that the number of cells 11 that are arranged between a pair of the second cooling members 13B may be set to a number that can be divided by the number of cells 11 that are connected in parallel (also referred to as the "parallel-connection number"). This makes connection of the cells 11 easier. For example, when two cells 11 are connected in parallel to form a cell set and a plurality of cell sets, each including the two parallel connected cells, are connected in series, the number of the cells 11 arranged between a pair of second cooling members 13B may be set to a multiple of 2, such as 10, 8, and 6. In another example, when three cells 11 are connected in parallel to form a cell set and a plurality of cell sets, each including the three parallel connected cells, are connected in series, the number of the cells 11 arranged between a pair of second cooling members 13B may be set to a multiple of 3, such as 12, 9, and 6.

In addition, the intervals between the second cooling members 13B are equal or narrower along the direction in which the refrigerant flows in the refrigerant pipe 12. Because of the heat exchange with the first cooling members 13A and the second cooling members 13B, the temperature of the refrigerant flowing through the refrigerant pipe 12 tends to be higher along a direction in which the plurality of cells 11 are arranged. Accordingly, when the intervals between the second cooling members 13B are equal, the amount of heat exchanged between the refrigerant pipe 12 and the first and second cooling members 13A and 13B becomes smaller along a direction in which the plurality of cells 11 are arranged. Therefore, variations in the capability of transferring heat among the second cooling members 13B can be lessened by setting the intervals between the second cooling members 13B to be equal or narrower along the direction in which the refrigerant flows in the refrigerant pipe 12, even in cases where the temperature of the circulating refrigerant becomes higher along the direction in which the plurality of cells 11 are arranged. Specifically, the intervals between the second cooling members 13B may be gradually narrower along the direction in which the refrigerant flows in the refrigerant pipe 12.

Alternatively, it is possible that heat capacities of the second cooling members 13B may be equal or greater along the direction in which the refrigerant flows in the refrigerant pipe 12. Such an embodiment also makes it possible to lessen variations in the capability of transferring heat among the second cooling members 13B, even in cases where the temperature of the circulating refrigerant becomes higher along the direction in which the plurality of cells 11 are arranged. Such an embodiment may be combined as appropriate with the embodiment in which the intervals between the second cooling members 13B are equal or narrower along the direction in which the refrigerant flows in the refrigerant pipe 12.

In the embodiment shown in FIG. 1, each of the cooling members 13 is disposed between sets of cell pairs 11A wherein each set of cell pairs 11A includes a plurality of cell pairs 11A of adjacent cells 11, along a direction in which the plurality of cells 11 are arranged. However, the arrangement of the cooling members 13 is not limited to such an embodiment. For example, it is also possible that each of the cooling members 13 may be disposed between each adjacent pair of the plurality of cells 11, along a direction in which the plurality of cells 11 are arranged. In this case, the second cooling members 13B may be disposed intermittently between adjacent cells 11, along a direction in which the plurality of cells 11 are arranged. In addition, the intervals between the second cooling members 13B may be equal or narrower along the direction in which the refrigerant flows in the refrigerant pipe 12. Further, it is possible that heat capacities of the second cooling members 13B may be equal or greater along the direction in which the refrigerant flows in the refrigerant pipe 12.

Figure 6:
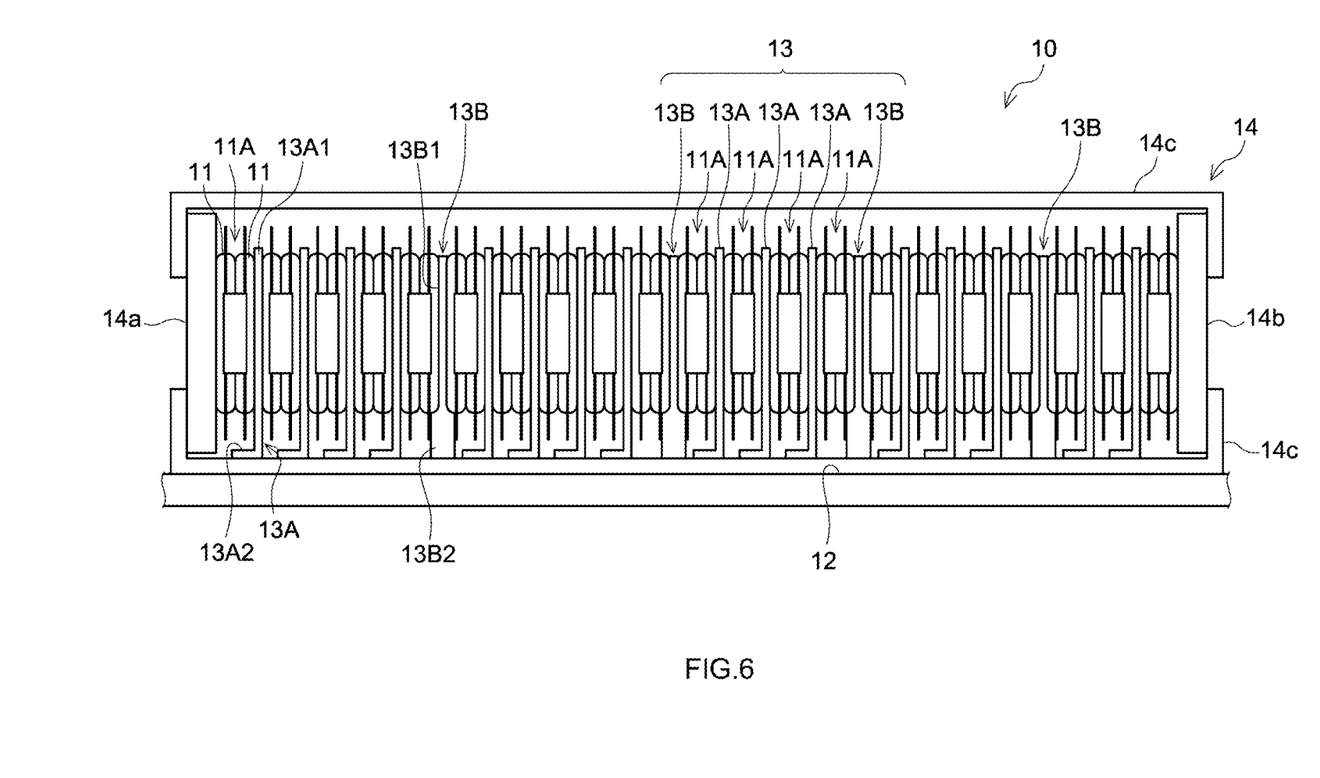
FIG. 6 is a side view schematically illustrating a modified example of the battery pack 10 disclosed herein.

FIG. 6 is a side view schematically illustrating a modified example of the battery pack 10 disclosed herein. In the modified example, as illustrated in FIG. 6, the support member 14c as a restraining band may be in contact with the refrigerant pipe 12, and the respective contact portions 13A2 and 13B2 of the first cooling members 13A and the second cooling members 13B may be in contact with the support member 14c as a restraining band. Thus, as illustrated in FIG. 6, in an exemplary embodiment of the contact portions 13A2 and 13B2 contacting the refrigerant pipe 12, the contact portions 13A2 and 13B2 may be in contact with the refrigerant pipe 12 via a member that is cooled by the refrigerant pipe 12, such as the support member 14c. In this case, the support member 14c that is in contact with the refrigerant pipe 12 may be made of a metal that has good heat conductivity and required mechanical strength.

Next, a modified example of the second cooling member 13B will be described.

Figure 7:
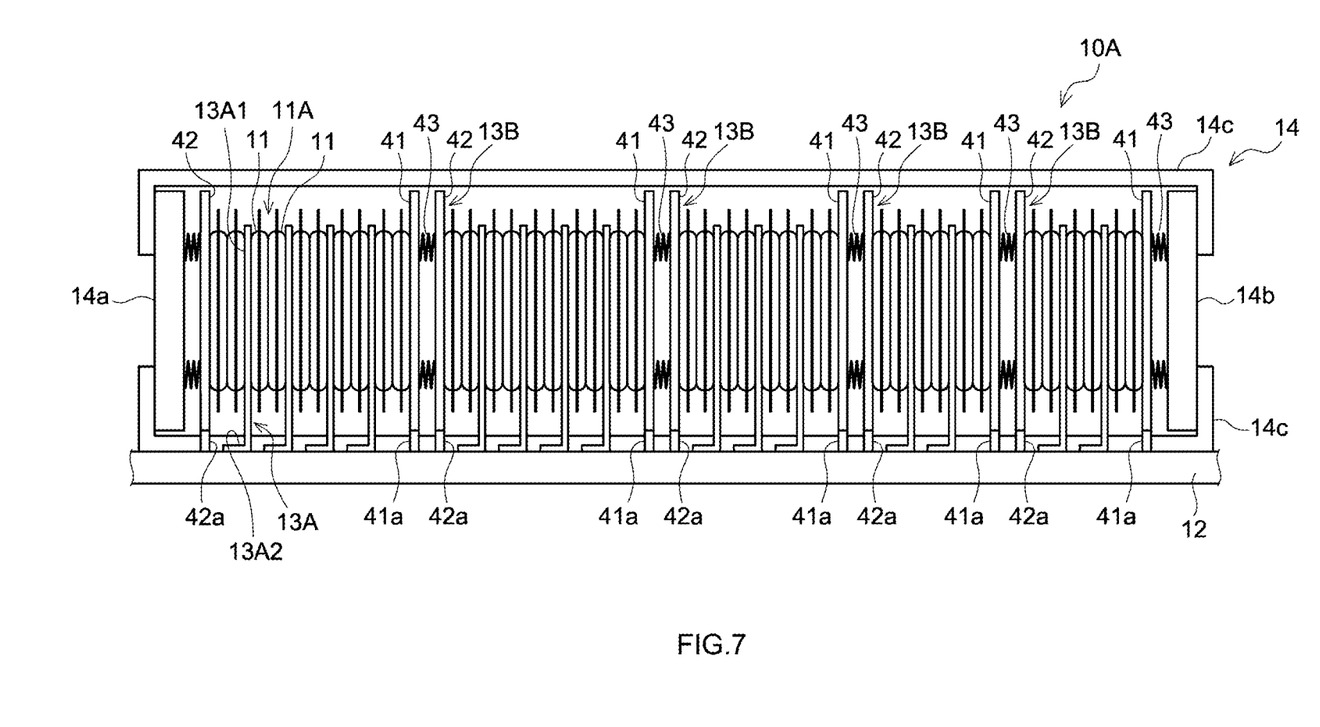
FIG. 7 is a side view illustrating a battery pack 10A according to another embodiment of the disclosure.

FIG. 7 is a side view illustrating a battery pack 10A according to another embodiment of the disclosure.

As illustrated in FIG. 7, each of the second cooling members 13B may include a pair of plates 41 and 42 respectively placed against respective planar portions 31 of the cells 11 adjacent thereto, and elastic bodies 43 disposed between the pair of plates 41 and 42. The plate 41 may include a contact portion 41a. The plate 42 may include a contact portion 42a. Each of the plates 41 and 42 may have a higher heat capacity and a greater contact area with the refrigerant pipe 12 than the first cooling members 13A.

The locations at which the second cooling members 13B are to be disposed are as described above. For example, the second cooling members 13B may be disposed intermittently between adjacent pairs of the cells 11 or between sets of adjacent cell pairs 11A, along the direction in which the plurality of cells 11 are arranged. Moreover, in this embodiment, as illustrated in FIG. 7, each of the restraining members 14a and 14b is also fitted to one of the plates 41 and 42 of the second cooling members 13B via elastic bodies 43. Although each of the elastic bodies 43 may be a metal spring, it may be broken if the applied force thereto exceeds the elastic range. From this viewpoint, when the applied force is great, it is possible to employ a non-metallic spring.

Thus, each of the second cooling members 13B includes a pair of plates 41 and 42, respectively placed against the planar portions 31 of the cells 11 adjacent thereto, and elastic bodies 43 disposed between the pair of plates 41 and 42. Such an embodiment allows the gap between the pair of plates 41 and 42 of each of the second cooling members 13B to change according to the expansion and contraction of the cells 11. This makes it possible to apply an appropriate restraining force to the cells 11. As a result, even when each of the cells 11 is an all-solid-state cell in particular, it is possible to provide sufficient contact between the solid electrolyte and the active material and keep the resistance low.

One of the pair of plates 41 and 42 (for example, the plate 41) may be disposed immovably relative to the restraining members 14a and 14b of the restraining unit 14. When this is the case, the other one of the plates (for example, the plate 42) may be disposed relatively movably relative to the restraining members 14a and 14b. This means that the second cooling member 13B as a whole does not move greatly, so that movement of the contact locations between the refrigerant pipe 12 and the pair of plates 41 and 42 can be kept small. As a result, for example, in cases where grease is applied to the contact locations, the amount of lubricant used, such as grease, is kept small. The plate 41 that is disposed immovably may be fixed to, for example, a portion of the restraining unit 14 [for example, the support member 14c (restraining band)].

Various embodiments of the battery pack have been described hereinabove according the present disclosure. Unless specifically stated otherwise, the embodiments of the battery pack described herein do not limit the scope of the present invention.

What is claimed is:
1. A battery pack comprising:
a plurality of cells;
a refrigerant pipe;
a plurality of cooling members; and
a restraining unit, wherein:
each of the plurality of cells includes a pair of planar portions opposed to each other, and the plurality of cells are arranged such that planar portions of each adjacent pair of the cells are in a face-to-face relationship;
the refrigerant pipe extends alongside the plurality of cells arranged side by side, and along a direction in which the plurality of cells are arranged;
each of the cooling members is disposed between each adjacent pair of the cells or between each set of adjacent pairs of the cells wherein each set of adjacent pairs of the cells includes a plurality of adjacent pairs of the cells; and
each of the cooling members includes a plate-shaped portion interposed between the cells and a contact portion jutting out from between the cells and contacting the refrigerant pipe;
the restraining unit includes a pair of restraining members and a support member supporting the pair of restraining members, the pair of restraining members restraining opposite ends of the plurality of cells arranged with the plurality of cooling members interposed; and
the plurality of cooling members include one or more first cooling members and one or more second cooling members, the one or more second cooling members having a heat capacity higher than the one or more first cooling members and a greater contact area with the refrigerant pipe than the one or more first cooling members;
wherein the one or more second cooling members are disposed intermittently between adjacent pairs of the cells or between sets of adjacent pairs of the cells, along a direction in which the plurality of cells are arranged;
wherein each of the one or more second cooling members includes a pair of plates and an elastic body disposed between the pair of plates, the pair of plates respectively placed against respective planar portions of the cells adjacent thereto in a region where the each of the one or more second cooling members is disposed;

each of the pair of the plates includes the contact portion, and has a higher heat capacity and a greater contact area with the refrigerant pipe than the one or more first cooling members; and wherein one of the pair of the plates is disposed immovably relative to the restraining member, and the other one of the pair of the plates is disposed movably relative to the restraining member.

\* \* \* \* \*